Patented Apr. 21, 1931

1,802,213

UNITED STATES PATENT OFFICE

HERBERT JOHN MALLABAR, OF WATFORD, ENGLAND

MANUFACTURE OF COMPOSITE GLASS

No Drawing. Application filed December 5, 1927, Serial No. 237,999, and in Great Britain February 24, 1927.

This invention concerns improvements in and relating to the manufacture of composite glass.

It has already been proposed to prepare composite glass, known as "splinterless glass", by securing a sheet of cellulose acetate between two sheets of glass. Difficulties have arisen, however, in securing satisfactory adhesion between the cellulose acetate and the glass.

In attempting to employ a method which is based upon softening the cellulose acetate prior to pressing it between glass sheets it is necessary to employ sheets of cellulose acetate, i. e. pieces approximating to 20 one thousandths of an inch in thickness and over which are usually cut from blocks. By the present invention it is possible to employ films of cellulose acetate which are of the order of 8 to 10 one thousandths of an inch and are cast from solution in continuous rolls, and can be made 1000 feet in length.

According to the present invention, the faces of the glass which are to be secured to the cellulose acetate and the faces of the cellulose acetate itself are separately coated with a strongly adherent layer of gelatine which is dried; the coated faces of the cellulose acetate and glass are then treated with a softening liquid and united by pressure. The softening liquid may be volatile or partly volatile. Thus a dilute solution of gelatine in volatile solvents can be employed.

One important feature of the present invention consists in treating a film or sheet of cellulose acetate with a solvent or softener, and then applying as a coating a layer of gelatine. Ether may suitably be employed for this purpose.

The solvent appears to form what may be termed a microporous surface and this enables the gelatine to unite very firmly with the cellulose acetate and form a substantially non-peelable film.

It is particularly desirable to employ cast films of cellulose acetate for this purpose since it is readily possible to apply the preliminary solvent or softener and spread the subsequent gelatine coating on both sides of the film to a uniform thickness. Preferably a film of about 10 one thousandths of an inch in thickness is built up by coatings on each side of about 3 one thousandths of an inch each to a final thickness of about 16 one thousandths of an inch.

Another important feature of the invention consists in treating the sheets of glass with a thin layer of a substance which will ensure adhesion of a gelatine coating. For this purpose a solution, e. g. 2% of water glass may be used but it is preferred to employ a solution, e. g. 2% of gelatine itself to which a very small proportion of a hardening agent, preferably chrome alum with sodium carbonate for neutralization of acid have been added. A very thin layer indeed of this solution is applied to the glass and allowed to dry. The surface of the glass so treated is then coated with a thin layer of gelatine which unites very firmly with the very thin surface layer and on drying produces a substantially non-peelable coating of gelatine on the glass.

A film of cellulose acetate so coated with a strongly adherent layer of gelatine and two sheets of glass each coated on one side with a strongly adherent layer of gelatine may now be readily united so as to form a composite "splinterless" glass sheet. The dried layers of gelatine are adhesive in nature when slightly moistened with suitable liquids and will readily unite autogenously to form a strongly cohesive composite sheet.

Preferably the prepared film of cellulose acetate and sheet of glass are united as follows:—

80 grams of hard emulsion gelatine are soaked in a mixture of 50 grams of glacial acetic acid and 80 grams of distilled water for 1 hour at room temperature and then raised to 50–60° C. 4 kilograms of methyl alcohol heated to the same temperature are added in a thin stream with constant stirring to avoid precipitation or flocculation of the gelatine. When the mixture has cooled 6 kilograms of acetone are added.

The glass sheets or the cellulose acetate film or both are dipped in this solution, the film then placed between the prepared sides of the glass sheets and the whole pressed together in a hot hydraulic press.

The method above described is a preferred form of the invention and variations may be made without departing from the scope of the invention. Thus a plurality of sheets of glass may be superposed with films of cellulose acetate between adjacent pairs.

Tinted composite glass may be prepared e. g. for antiglare glasses or snow goggles by incorporating a dyestuff in the gelatine or in the cellulose acetate or in one or more of the sheets of glass. Preferably the layer of gelatine adhering to the cellulose acetate is tinted but the layer adhering to the glass may be so treated. Alternatively the cellulose acetate may be tinted by coating one or both faces with a solution of colour. One face may be coated with one colour and the other face with another colour to give the required shade.

If desired a water-white composite sheet may be produced by incorporating in the same manner a very small quantity of a blue-violet colour e. g. such as is described in co-pending application, Serial Number 237,998 filed December 5th, 1927. This may be incorporated with the cellulose acetate as described and claimed in the aforementioned application. The gelatine layer adhering to one or more of the sheets of glass may be tinted with the blue violet colour or alternatively the glass itself may be tinted.

If desired in one sheet of glass there may be incorporated a blue colour and in another sheet a pink colour for the neutralization of the yellowish tinge in the cellulose acetate.

The expression cellulose acetate throughout the specification refers to compositions consisting wholly or principally of cellulose acetate.

I declare that what I claim is:—

1. Method of forming composite sheets of glass and cellulose acetate by treating the faces of the cellulose acetate with a volatile softener, applying to said faces a solution of gelatine, drying to produce a strongly adherent layer of gelatine, treating the faces of the glass sheets with a very thin layer of a solution of gelatine containing a hardening agent, drying said solution applying a solution of gelatine, drying to produce a strongly adherent layer of gelatine, applying a volatile softening liquid to said gelatine layers and uniting said cellulose acetate to said glass sheets by pressure.

2. A composite sheet of glass and cellulose acetate containing the following layers in the order specified: glass, hardened gelatine, gelatine, cellulose acetate, gelatine, hardened gelatine, glass.

3. A composite sheet of glass and cellulose acetate containing the following layers in the order specified: glass, hardened gelatine, gelatine, a water white film of cellulose acetate containing a blue violet colour, gelatine, hardened gelatine, glass.

4. Method of forming composite sheets of glass and cellulose acetate which consists in pretreating glass sheets to render them adherent for soluble gelatine, coating glass sheets so treated with a layer of soluble gelatine, pretreating a sheet of cellulose acetate with a volatile liquid, coating said sheet with soluble gelatine, placing said coated sheet of cellulose acetate between said sheets of glass and uniting them together by pressure in presence of a volatile softening liquid for gelatine.

5. Method of forming composite sheets of glass and cellulose acetate which consists in pretreating glass sheets to render them adherent for soluble gelatine, coating glass sheets so treated with a layer of soluble gelatine, pretreating a sheet of cellulose acetate with ether, coating said sheet with soluble gelatine, placing said coated sheet of cellulose acetate between said sheets of glass and uniting them together by pressure in presence of a volatile softening liquid for gelatine.

6. Method of forming composite sheets of glass and cellulose acetate, which consists in pretreating glass sheets by coating them with a very thin layer of hardened but still soluble gelatine, coating the sheets so treated with a further layer of soluble gelatine, pretreating a sheet of cellulose acetate with a volatile liquid, coating said sheet with soluble gelatine, placing said coated sheet of cellulose acetate between said sheets of glass, and uniting them together by pressure in presence of a volatile softening liquid for gelatine.

7. Method of forming composite sheets of glass and cellulose acetate which consists in pretreating glass sheets by coating them with a very thin layer of hardened but still soluble gelatine, coating the sheets so treated with a further layer of soluble gelatine, pretreating a sheet of cellulose acetate with ether, coating said sheet with soluble gelatine, placing said coated sheet of cellulose acetate between said sheets of glass and uniting them together by pressure in presence of a volatile softening liquid for gelatine.

8. Method of forming composite sheets of glass and cellulose acetate which consists in pretreating glass sheets to render them adherent for soluble gelatine, coating glass sheets so treated with a layer of soluble gelatine, pretreating a sheet of cellulose acetate with a volatile liquid, coating said sheet with soluble gelatine, placing said coated sheet of cellulose acetate between said sheets of glass and uniting them together by pressure in presence of a solution of gelatine in a volatile solvent.

9. Method of forming composite sheets of glass and cellulose acetate which consists in pretreating glass sheets by coating them with a very thin layer of hardened but still soluble gelatine, coating the sheets so treated with a further layer of soluble gelatine, pretreating a sheet of cellulose acetate with a volatile liquid, coating said sheet with soluble gelatine, placing said coated sheet of cellulose acetate between said sheets of glass, and uniting them together by pressure in presence of a solution of gelatine in a volatile solvent.

10. Method of forming composite sheets of glass and cellulose acetate which consists in pretreating glass sheets by coating them with a very thin layer of hardened but still soluble gelatine, coating the sheets so treated with a further layer of soluble gelatine, pretreating a sheet of cellulose acetate with ether, coating said sheet with soluble gelatine, placing said coated sheet of cellulose acetate between said sheets of glass and uniting them together by pressure in presence of a solution of gelatine in a volatile solvent.

In witness whereof, I have hereunto signed my name this 24th day of November, 1927.

HERBERT JOHN MALLABAR.